United States Patent [19]

Küppers et al.

[11] 4,145,456
[45] Mar. 20, 1979

[54] METHOD OF PRODUCING INTERNALLY COATED GLASS TUBES FOR THE DRAWING OF FIBRE OPTIC LIGHT CONDUCTORS

[76] Inventors: Dieter Küppers, Aachen; Hans Lydtin, Stolberg; Ludwig Rehder, Aachen, all of Fed. Rep. of Germany

[21] Appl. No.: 852,068

[22] Filed: Nov. 16, 1977

Related U.S. Application Data

[63] Continuation of Ser. No. 610,570, Sep. 5, 1975, abandoned.

[30] Foreign Application Priority Data

Sep. 14, 1974 [DE] Fed. Rep. of Germany ....... 2444100

[51] Int. Cl.² .......................... B05D 3/06; C23C 11/00
[52] U.S. Cl. ........................ 427/38; 65/3 A; 138/145; 138/177; 204/164; 350/96.31; 427/39; 427/167; 427/255
[58] Field of Search .................. 427/38, 39, 167, 163, 427/237, 255; 65/3 R, 3 A; 350/96 WG; 138/145, 177; 204/164

[56] References Cited

U.S. PATENT DOCUMENTS

| 3,484,276 | 12/1969 | Burggraaf et al. | 427/237 |
| 3,711,262 | 1/1973 | Keck et al. | 65/3 A |
| 3,932,162 | 1/1976 | Blankenshid | 65/3 A |
| 3,934,061 | 1/1926 | Keck et al. | 427/165 |
| 3,938,974 | 2/1976 | Macedo et al. | 65/3 R |
| 3,957,474 | 5/1976 | Kobayashi et al. | 65/3 A |
| 3,961,926 | 6/1976 | Asam | 65/3 A |
| 4,011,006 | 3/1977 | Fleming, Jr. et al. | 350/96 WG X |

FOREIGN PATENT DOCUMENTS 622011 6/1961 Canada ...................... 427/255

OTHER PUBLICATIONS

Powell, C. F. et al., *Vapor Deposition*, The Electrochemical Society, John Wiley & Son, Inc., New York (1966), p.424.

*Primary Examiner*—Ronald H. Smith
*Assistant Examiner*—Thurman K. Page

[57] ABSTRACT

In the reactive deposition of the core material from a gas which is passed through the tube onto the inner wall of the tube by means of a plasma zone, while a relative motion is effected in the axial direction between the tube and a plasma-producing device, the rate of precipitation is increased without impairing the quality of the core material coat, the reactive deposition being effected at a pressure of from 1 to 100 Torr and a temperature zone being superimposed on the plasma zone.

3 Claims, 2 Drawing Figures

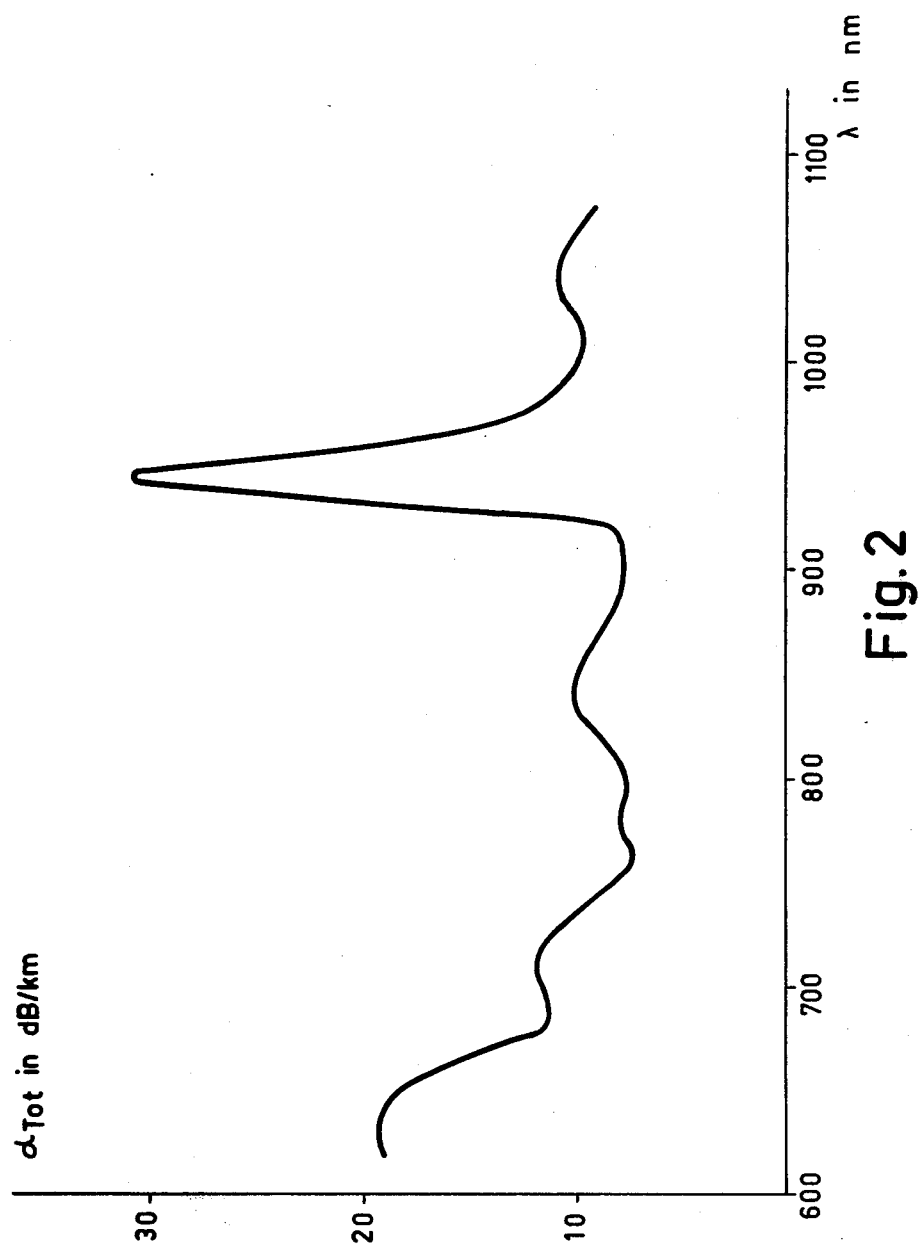

METHOD OF PRODUCING INTERNALLY COATED GLASS TUBES FOR THE DRAWING OF FIBRE OPTIC LIGHT CONDUCTORS

BACKGROUND OF THE INVENTION

This is a continuation of application Ser. No. 610,570, filed Sept. 5, 1975, now abandoned.

The invention relates to a method for producing internally coated glass tubes, consisting of a core and a jacket of glasses which have a mutually different refractive index, by means of a reactive deposition of the coating from a gas mixture which is passed through the tube and which is brought to reaction in the tube.

The tubes produced in this manner are heated to a temperature which is suitable for drawing and thereafter drawn to such an extent that the diameter is reduced until the coating is brought to coincidence and a light conductor of the required diameter is obtained.

Light conductors consist of a light-conducting core which is embedded in a jacket of a lower refractive index. The core may, for example, consist of quartz glass which has been doped with a few percent of a metal oxide which increases the refractive index and the jacket of undoped quartz glass.

For the doping of the core glass $TiO_2$, $GeO_2$ and $Al_2O_3$ may, for example, be used. In the so-called self-focussing fibre optic light conductors a parabolic change in the refractive index across the radius is obtained by means of a continuous change in the grades of doping. According to a known method such internally coated quartz glass tubes are produced in which gaseous $SiCl_4$ and oxygen or a mixture of $SiCl_4$, $TiCl_4$ and oxygen are passed through a tube brought there to reaction in the gas phase by means of high frequency energization and probably precipitated at least partly as a soot-like glass coat, which must thereafter be melted or sintered. There is a danger that gases are trapped which later on might form light scattering centers. The heat treatment makes the formation of a doping profile as required for self-focussing fibre optic light conductors difficult, owing to blurring due to diffusion.

The tube may consist of non-doped quartz glass. In this method a uniform relative motion in axial direction may be caused between the tube and a high frequency pulse which envelopes the tube a uniform distribution of the deposit is enhanced by the fact that the tube is rotated during the coating procedure.

SUMMARY OF THE INVENTION

It is an object of the invention to provide a method of the aforementioned kind in which the rate of deposition is relatively large, in which coatings of a good quality are obtained and that the deposition is not the result of a homogeneous reaction in the gas phase but of a heterogeneous reaction on the wall. According to the invention this object is realized by means of a method which is characterized in that in the tube a non-isothermal plasma zone is produced for the activation of the reactive deposition while a relative motion is caused between the tube and the equipment which produces the plasma, and a temperature zone in which the tube is heated to such a temperature that the deposited coatings are stress-free is superimposed on the plasma zone and that deposition takes place at a pressure of between 1 and 100 Torr.

In this respect a non-isothermal plasma is understood to mean a zone in which the kinetic energy of the gas particles is small compared with the energy of the excited electronic states. In spite of the low translational energy, many dissociated and ionised particles are available, which are favourable for the reaction and promote it.

With the method according to the invention well-adhering, crackfree or substantially crackfree coatings are formed on the tube wall. This is probably explained by the fact that in the method according to the invention the precipitation of the doped quartz glass takes mainly place on the tube wall and no or practically no soot-like particles are formed in the gas atmosphere. However it appeared that at pressures over 100 Torr the non-isothermal plasma gradually changes into an isothermal plasma and that the reactive deposition also takes place in gas while glass soot is formed.

The method according to the invention also enables the direct reactive deposition on a quartz wire or quartz rod which is arranged inside the tube.

With the method according to the invention deposition rates of from 2500 $\mu$m/hour can be attained. The method according to the invention makes it therefore possible to obtain in an economic way a uniform deposition over long tube lengths.

In the method according to the invention a heating up of the tube (temperature zone) of greater length is superimposed on the plasma zone. The temperature shall then not be chosen that high that a homogeneous gas reaction could take place, but it must at least be chosen that high that the deposited coatings are stress-free. Heating of the tube to a temperature of between 800° C. and 1200° C., for example in the $GeCl_4$/oxygen system, does not or to only a small extent affect the deposition rate. In the temperature zone the consistency of the deposited coating is favourably influenced on the one hand because, at the chosen temperatures the mobility of the deposited matter is still sufficient to obtain a stress-free coat and on the other hand because the embedding of gaseous reaction products is avoided.

At temperatures which are too low, in general below 800° C. gases such as chlorine produced during the reaction may be trapped. At temperatures over 1200° C. reaction in the gas phase takes also place while soot-like particles are formed at the same time.

The plasma may be produced in any way, known in the art, for example by the inductive or capacitive coupling of a high frequency field or in a microwave resonator.

BRIEF DESCRIPTION OF THE DRAWINGS

The invention will be further explained with reference to the drawing and the following examples.

In the drawing

FIG. 2 shows the attenuation of a fibre optic light conductor drawn from a tube produced according to the invention.

DESCRIPTION OF PREFERRED EMBODIMENTS

Figure 1:
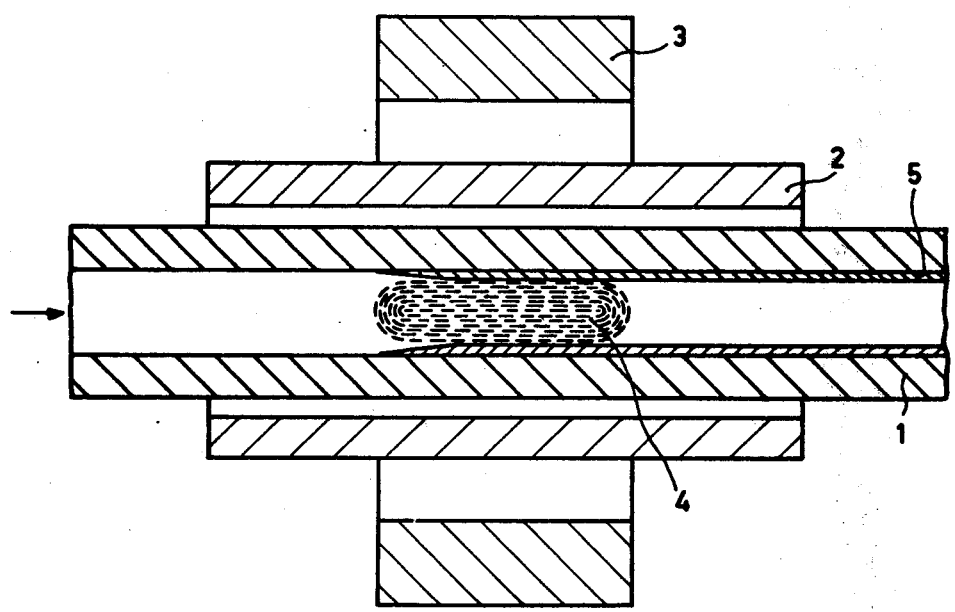
FIG. 1 is a diagrammatic representation of a device for performing the method according to the invention.

A tube 1, for example made of quartz is moved to a heating device 2, for example an electric heating coil in the direction indicated by arrows. The heating device 2 is enveloped by a resonator 3 by means of which a plasma 4 can be produced in the gas mixture passed through the quartz tube 1.

In the reactive deposition a coating 5 is directly formed on the inner wall of the tube 1.

EXAMPLE I

The deposition of non-doped $SiO_2$. A gas mixture consisting of $SiCl_4$ and oxygen was passed through a quartz tube 1 (length 150 cm, outer diameter = 8 mm, inner diameter = 6 mm) at a throughput of 545 cm$^3$/minute. The mixture consisted of 7 volume % $SiCl_4$ and 93 volume % oxygen. The pressure in tube 1 was 12 Torr. The wall temperature was kept at 1000° C. The tube 1 was passed at a speed of 0.17 cm per minute through the device, formed by heating device 2 having a length of 500 mm and resonator 3 having a length of 30 mm, while a plasma 4 was produced by a 2.45 GHz generator. An $SiO_2$ coating having a thickness of 130 μm was formed directly on the tube wall. A gas phase reaction together with the formation of soot-like particles did not take place. The reaction efficiency in the plasma 4 is then almost 100%. The coating formed adheres well and is homogeneous. The gas mixture was measured in scm$^3$ (standard cubic centimeters). 1 scm$^3$ is one cm$^3$ of the gas, where P = 760 mm and T = 0° C.

EXAMPLE II

The deposition of an $SiO_2$ - coat doped with $GeO_2$. A mixture of $SiCl_4$ and oxygen, consisting of 4 volume % $SiCl_4$ and 96 volume % oxygen was used to which increasing linearly with time, $GeCl_4$ was added until the content of $GeCl_4$ was 0.4% by volume. The pressure was 10 Torr. The wall temperature was kept at 960° C. The throughput was 40 scm$^3$/minute and the duration of the test was 2 hrs. A well-adhering $SiO_2$ coat doped with $GeO_2$ was obtained. The coating consisted of 940 single layers of an increasing $GeO_2$ content. The resonator 3 was moved forward and backward along the tube in this test at 60 cm/min.

EXAMPLE III

A mixture of 0.4 volume % $AlCl_3$ volume % $SiCl_4$ and 95.6 volume % oxygen was passed through the quartz tube at a throughput of 42 scm$^3$ per minute (length and diameter as in Example I). The pressure in the tube 1 was 15 Torr. The wall temperature of the tube 1 was kept at 950° C. A plasma 4 as in Example I was produced. (Power 180 W, frequency 2.45 GHz). The reaction efficiency was approximately 100%. The tube was passed through the device 2-3 at a speed of 60 cm per minute while the resonator 3 was moved forward and backward along the tube 1. A homogeneous, adhering coat 5 was obtained. The total thickness of the coating was 150 μm.

FIG. 2 shows the total attenuation in dB per km as a function of the wavelength in micrometer of a fiber optic light conductor which was obtained by drawing at 1900° C. of an internally coated tube according to Example II. The core diameter was 25 μm and the fiber diameter was 100 μm. The difference in the refractive indexes were approximately 5 o/oo.

By means of the method according to the invention a coating profile which has a certain refractive index in proportion to the doping can be obtained as shown above at a progressive change of the doping share. When a suitable profile is chosen the tube forms in an ideal manner a basic product for the production of monomode, multimode and self-focussing fiber optics.

What is claimed is:

1. A method of producing internally coated glass tubes for drawing fiber optic light conductors which consists of a core and a jacket of glasses which have a mutually different refractive index, comprising the steps of introducing into a glass tube surrounded by a resonator a reactive gas mixture consisting of $SiCl_4$ and oxygen at a pressure of about 1 to 100 Torr, adding $GeCl_4$ to the gas mixture, moving the tube relative to the resonator to form a non-isothermal plasma zone within the tube, and heating the tube to a temperature between 800° C.–1200° C. to form a coating free of soot-like particles and consisting of a plurality of layers of $SiO_2$ doped with an increasing content of $GeO_2$.

2. A method as claimed in claim 1 wherein the gas mixture consists of about 96% by volume of oxygen and 4% by volume of $SiCl_4$.

3. A method as claimed in claim 2 wherein up to 0.4% by volume of germanium tetrachloride ($GeCl_4$) is added to the reactive gas mixture.

* * * * *